Nov. 13, 1956    R. S. ROWDEN    2,770,078
TOOL SHARPENER
Filed Feb. 14, 1955
FIG. 1.
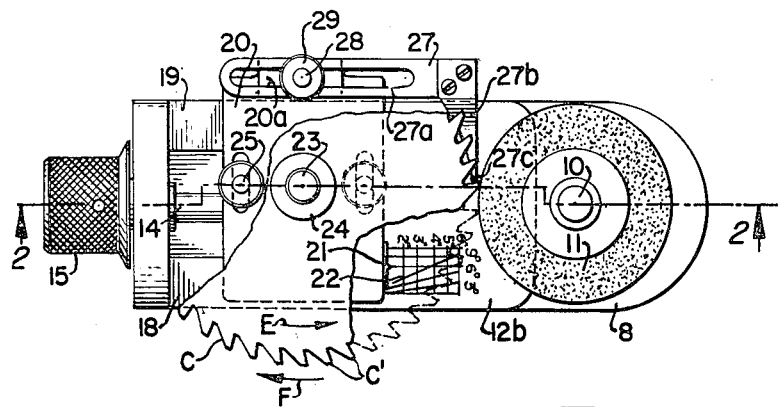
FIG. 2.
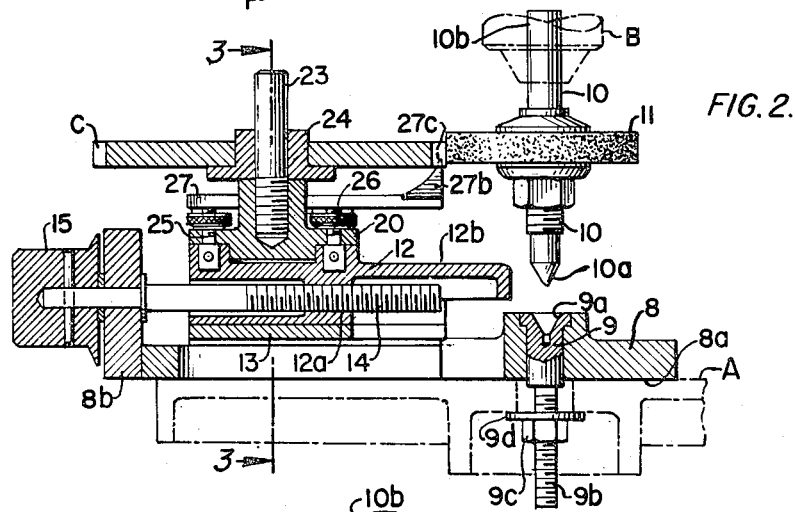
FIG. 3.
FIG. 4.
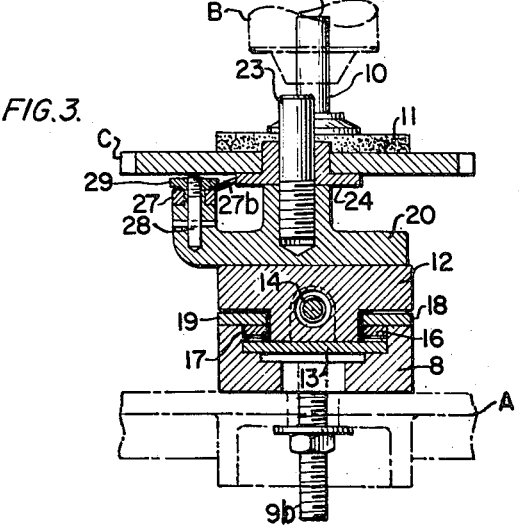
ROBERT S. ROWDEN,
INVENTOR.
BY
Wm. H. Dean
AGENT.

United States Patent Office 2,770,078
Patented Nov. 13, 1956

2,770,078

TOOL SHARPENER

Robert S. Rowden, Alhambra, Calif.

Application February 14, 1955, Serial No. 487,862

12 Claims. (Cl. 51—34)

This invention relates to a tool sharpener and more particularly to a tool sharpener which may be supported on the table of a drill press for the purpose of sharpening milling cutters by means of a grinder wheel rotatably supported by the drill press arbor.

The present invention while best adapted for use in connection with a drill press may be used on other machines if desired.

The sharpening of milling cutters requires precise and specialized equipment heretofore quite complicated and expensive whereby most machine shops have found that it has not been profitable to sharpen their own milling cutters. In accordance with the present invention a very simple and accurate cutter tool sharpener may be readily and quickly attached to a drill press table and the cutter may be sharpened by means of a grinding wheel rotatably supported on the drill press arbor. Use of the present invention does not require more than average skill in the operation thereof in order to attain properly sharpened milling cutters. While the present invention is particularly adapted for use in sharpening milling cutters it may be employed for use in providing a proper leading bevel on machine threading die elements.

It is an object of the present invention to provide a sharpening tool which is very simple to operate, economical to procure and which may be produced in a price range which will permit small machine shop operators to sharpen their own milling cutters in a profitable and expeditious manner.

Another object of the invention is to provide a sharpening tool of this class which may be very quickly and easily set up on a drill press and which provides for very precise sharpening of milling cutter teeth extremities.

Another object of the invention is to provide a tool sharpener of this class having novel means for quickly locating the same on a drill press table and for providing the proper off-set relation of the cutter axis relative to the grinding wheel axis in order to attain a proper predetermined sharpening angle to corresponding with the extremities of the teeth of the milling cutter.

A further object of the invention is to provide a sharpening tool of this class having very simple and positive means for setting up the cutter to be sharpened.

Further objects and advantages of the invention will be apparent from the following specification, appended claims and accompanying drawings in which:

Fig. 1 is a top or plan view of a tool sharpener in accordance with the present invention showing a milling cutter positioned thereon and having portions thereof broken away to amplify the illustration. Fig. 2 is a vertical sectional view taken from the line 2—2 of Fig. 1 showing the tool sharpener in relation to elements of a drill press which are illustrated by broken lines. Fig. 3 is a sectional view taken from the line 3—3 of Fig. 2 showing in broken lines a drill press table, and Fig. 4 is a perspective view of a tool fixture adapted to be supported on the tool post of the tool sharpener for the purpose of supporting machine threading die elements in proper position to have their leading edge portions beveled.

As shown in Fig. 2 of the drawing, the tool sharpener according to the present invention is provided with a base 8 having a lower surface 8a engageable with the upper surface of a drill press table as indicated by broken lines A. Extending upwardly from the base 8 is an aligning member 9 having a conical recess aligning portion 9a adapted to conform to a conical portion 10a of a grinding wheel shaft 10 which supports a grinding wheel 11 and is engaged at its upper end 10b within a drill press chuck as illustrated by broken lines B. The grinding wheel shaft 10 as referred to herein is a tool shaft on which the grinding wheel 11 is supported. It will be understood, however, that this shaft 10 may be used to support a tool other than one of the abrasive type. The aligning member 9 extends downwardly through the base 8 and the drill press table A. This aligning member 9 at its lower end is provided with a screw-threaded portion 9b having a nut 9c screw-threaded thereon. This nut 9c engages a washer 9d which bears upon the lower side of the drill press table A providing an abutment for holding the base 8 securely on the table A. The base 8 is provided with an end member 8b having a lead screw 14 rotatably mounted therein. The lead screw 14 is provided with an adjusting knob 15 for use in manually turning the lead screw 14. The lead screw 14 is screw-threaded in a nut portion 12a of a carriage 12 which is provided with a gib retainer 13 which carries spring loaded gibs 16 and 17 slidable on the lower sides of the gib slide rails 18 and 19 as shown in Fig. 3 of the drawing. As shown in Fig. 1 of the drawings it will be seen that the axis of the shaft 10 is aligned with the axis of the lead screw and also the vertical axis of the aligning member 9. It will therefore be understood that the aligning member 9 serves to initially set up axial relationship of the lead screw 14 relative to the drill press arbor axis about which the chuck B rotates. Supported on the carriage 12 is a cross slide plate 20 which is secured to the carriage by means of bolts 25 and 26 having thumb screws which bear upon the upper side of said cross slide plate for fixing the same in certain position relative to the carriage 12. As shown in Fig. 1 of the drawings the cross slide plate 20 carries a pointer 21 which is directed toward a scale 22 on the upper surface 12b of the carriage 12. The scale 22 is arranged to indicate the relation of the grinding angle to that of the wheel diameter. Thus, the operator of the tool sharpener may quickly refer to the scale 22 after having first determined the diameter of the wheel and may then set the pointer 21 to correspond with the desired angle to be obtained at the extremity of the cutter teeth. While the cross slide plate 20 carries the pointer 21 it also carries the tool post 23 on which a cutter C may be supported by means of a bushing 24. Thus, the pointer 21 in reference to the scale 22 provides for a predetermined off-set relationship of the axis of the tool post 23 relative to the tool shaft 10. Carried by the cross slide plate 20 is a tool stop member 27 which has a central slot 27a slidable over a guide rib 20a of the cross slide plate 20. A bolt 28 fixed to the plate 20 is provided with a screw-threaded nut 29 which bears upon the tool stop member 27 to fix the same in certain adjusted position. The tool stop member 27 is provided with a resilient finger 27b having an end portion 27c adapted to engage milling cutter teeth C' inwardly of their cutting edges in order to maintain the same in certain indexed relation to the grinding wheel 11 and axis of the tool post 23, all as indicated by broken lines in Fig. 1 of the drawings. The finger 27b as shown in Figs. 2 and 3 of the drawings extends upwardly from a position slightly below the milling cutter C whereby the cutter may be rotated one tooth at a time over and past the end 27c of the finger 27b in order to index successive cutter teeth for the purpose of sharpening the same by means of the grinding wheel 11. As shown in Fig. 4 of the drawing, a fixture 30 is provided with clamp plates 30a and 30b which support a machine threading die element D having a side D' which may be engaged by the end 27c of the finger 27 when a bore 30c of the fixture is placed in surrounding relation with the tool post 23. In such position the leading edge portion D" of the machine threading die element may be properly beveled by the grinding wheel 11 so that it will have the proper starting angle to initiate the cutting of screw threads when used in threading dies such as those operable in automatic screw machines or the like.

The operation of the tool sharpener, in accordance with the present invention, is substantially as follows: The base 8 of the tool sharpener is first placed upon the drill press table A whereon said base is so located that the aligning member 9 projects through the center of the drill press table thereby permitting the conical end 10a of the grinding wheel shaft 10 to be projected into the conical recess 9a of the aligning member 9. This provides for axial alignment of the member 9 with the shaft 10 and consequent location of the base on the drill press table A. When so located the nut 9c is tightened on the screw-threaded portion 9b of the aligning member 9 and the base 8 is fixed in proper set up position. The cross slide plate 20 is adjusted, as hereinbefore described, in accordance with the desired angle to be ground at the extremities of cutter teeth to be sharpened. The nuts on the bolts 25 and 26 are tightened fixing the cross slide 20 in the desired position whereupon a bushing 24 of the proper size to fit the internal bore of the cutter C is placed upon the tool post 23. The cutter is then placed on the bushing 24 and the carriage 12 is slowly advanced toward the axis of the tool shaft 10 by means of the lead screw 14 which is adjusted by the manually operable knob 15. The cutter C is held in the direction of the arrow E forcing one of the cutter teeth into engagement with the end 27c of the finger 27 until the tooth so engaged with the finger slightly engages the grinding wheel 11. The arbor of the drill press is then released permitting it to move upwardly thereby carrying the grinding wheel upwardly above the plane of the cutter C. The cutter C is then rotated in the direction of the arrow F in Fig. 1 of the drawing until the next adjacent tooth rides over the resilient finger 27b and engages the end 27c thereof. The drill press arbor is then moved downwardly whereupon the grinding wheel 11 again grinds another cutter tooth and each successive tooth of the cutter C is held against the end 27c of the finger 27b during the working thereof by the grinding wheel 11. When the last cutter tooth is ground it will be readily apparent to the operator due to the fact that the grinding wheel 11 will barely touch successive teeth which have been previously ground in accordance with the initial setting of the lead screw 14 and carriage 12. It will be understood that the tool shaft 10 may carry tools other than grinding wheels and that articles being machined thereby may be other than milling cutters.

The simplicity of construction and operation of the present invention in addition to its usefulness in connection with a conventional drill press provides for the sharpening of milling cutters and other tools by machine shop operators who have previously been unable to do such work in their own shops. Since almost every machine shop employs a drill press the present invention provides a very simple means which may be quickly and accurately used to sharpen milling cutters used on production machines.

Having thus described the invention it is desired to emphasize the fact that modifications may be made therein limited only by a just interpretation of the following claims.

I claim:

1. A base adapted to be secured on a machine tool, an aligning means on said base, a tool shaft having second means cooperable with said aligning means for initially locating said base with respect to the axis of a tool chuck in which said tool shaft may be carried, third means for fixing said base on a machine tool employing said chuck, a carriage on said base and movable laterally with respect to the axis of said tool shaft, a tool post supported by said carriage and movable thereby with respect to said tool shaft, and a sharpening tool on said tool shaft, said tool post disposed to support a tool to be sharpened by said sharpening tool, said second means disengaged from said aligning means when said sharpening tool engages said tool to be sharpened.

2. A base adapted to be secured on a machine tool, an aligning means on said base, a tool shaft having second means cooperable with said aligning means for initially locating said base with respect to the axis of a tool chuck in which said tool shaft may be carried, third means for fixing said base on a machine tool employing said chuck, a carriage on said base and movable laterally with respect to the axis of said tool shaft, a tool post supported by said carriage and movable thereby with respect to said tool shaft, a sharpening tool on said tool shaft, said tool post disposed to support a tool to be sharpened by said sharpening tool, said second means disengaged from said aligning means when said sharpening tool engages said tool to be sharpened, and a stop member engageable with a portion of a tool to be sharpened for holding it in position while being worked by said sharpening tool.

3. A base adapted to be secured on a machine tool, an aligning means on said base, a tool shaft having second means cooperable with said aligning means for initially locating said base with respect to the axis of a tool chuck in which said tool shaft may be carried, third means for fixing said base on a machine tool employing said chuck, a carriage on said base and movable laterally with respect to the axis of said tool shaft, a tool post supported by said carriage and movable thereby with respect to said tool shaft, a sharpening tool on said tool shaft, said tool post disposed to support a tool to be sharpened by said sharpening tool, said second means disengaged from said aligning means when said sharpening tool engages said tool to be sharpened, a stop member engageable with a portion of a tool to be sharpened for holding it in position while being worked by said sharpening tool, and said stop member having a resilient finger adapted to engage teeth of a cutter tool to be sharpened.

4. A base adapted to be secured on a machine tool, an aligning means on said base, a tool shaft having second means cooperable with said aligning means for initially locating said base with respect to the axis of a tool chuck in which said tool shaft may be carried, third means for fixing said base on a machine tool employing said chuck, a carriage on said base and movable laterally with respect to the axis of said tool shaft, a tool post supported by said carriage and movable thereby with respect to said tool shaft, a sharpening tool on said tool shaft, said tool post disposed to support a tool to be sharpened by said sharpening tool, said second means disengaged from said aligning means when said sharpening tool engages said tool to be sharpened, a stop member engageable with a portion of a tool to be sharpened for holding it in position while being worked by said sharpening tool, said stop member having a resilient finger adapted to engage teeth of a cutter tool to be sharpened and said stop member and a tool post adjustable laterally of the axis of said tool shaft relative to said carriage whereby the desired angle of cutter teeth extremity, on a tool to be sharpened, may be predetermined.

5. A base adapted to be secured on a machine tool, an aligning means on said base, a tool shaft having second means cooperable with said aligning means for initially locating said base with respect to the axis of a tool chuck in which said tool shaft may be carried, third means for fixing said base on a machine tool employing said chuck, a carriage on said base and movable laterally with respect to the axis of said tool shaft, a tool post supported by said carriage and movable thereby with respect to said tool shaft, and a sharpening tool on said tool shaft, said tool post disposed to support a tool to be sharpened by said sharpening tool, said second means disengaged from said aligning means when said sharpening tool engages said tool to be sharpened, said aligning means and said second means having cooperable mating elements, one of said mating elements being conical and the other of said elements having a recess conforming thereto.

6. A base adapted to be secured on a drill press, an aligning means on said base, a tool shaft having second means cooperable with said aligning means for initially locating said base with respect to the axis of a drill press tool chuck in which said tool shaft is carried, third means for fixing said base on a drill press, a carriage on said base and movable laterally with respect to the axis of said tool shaft, a tool post supported by said carriage and movable thereby with respect to said tool shaft, a sharpening tool on said tool shaft, said tool post disposed to support a tool to be sharpened by said sharpening tool, said second means disengaged from said aligning means when said sharpening tool engages said tool to be sharpened, said aligning means and said second means having cooperable mating elements, one of said mating elements being conical and the other of said elements having a recess conforming thereto.

7. A base adapted to be secured on a drill press, an aligning means on said base, a tool shaft having second means cooperable with said aligning means for initially locating said base with respect to the axis of a drill press tool chuck in which said tool shaft is carried, third means for fixing said base on a drill press, a carriage on said base and movable laterally with respect to the axis of said tool shaft, a tool post supported by said carriage and movable thereby with respect to said tool shaft, and a sharpening tool on said tool shaft, said tool post disposed to support a tool to be sharpened by said sharpening tool, said second means disengaged from said aligning means when said sharpening tool engages said tool to be sharpened, said aligning means and said second means having cooperable mating elements, one of said mating elements being conical and the other of said elements having a recess conforming thereto, said stop member and said tool post adjustable laterally of the axis of said tool shaft relative to said carriage, whereby the desired angle of cutter teeth extremities on a tool to be sharpened, may be predetermined.

8. A base adapted to be secured on a machine tool, an aligning means on said base, a tool shaft having second means cooperable with said aligning means for initially locating said base with respect to the axis of a tool chuck in which said tool shaft may be carried, third means for fixing said base on a machine tool employing said chuck, a carriage on said base and movable laterally with respect to the axis of said tool shaft, a tool post supported by said carriage and movable thereby with respect to said tool shaft, a sharpening tool on said tool shaft, said tool post disposed to support a tool to be sharpened by said sharpening tool, said second means disengaged from said aligning means when said sharpening tool engages said tool to be sharpened, a stop member engageable with a portion of a tool to be sharpened for holding it in position while being worked by said sharpening tool, and a plate on said carriage movable relative thereto at substantially right angles to the direction in which said carriage moves relative to the axis of said tool shaft, said slide plate supporting said tool post in stationary relation to said carriage.

9. A base adapted to be secured on a machine tool, an aligning means on said base, a tool shaft having second means cooperable with said aligning means for initially locating said base with respect to the axis of a tool chuck in which said tool shaft may be carried, third means for fixing said base on a machine tool employing said chuck, a carriage on said base and movable laterally with respect to the axis of said tool shaft, a tool post supported by said carriage and movable thereby with respect to said tool shaft, a sharpening tool on said tool shaft, said tool post disposed to support a tool to be sharpened by said sharpening tool, said second means disengaged from said aligning means when said sharpening tool engages said tool to be sharpened, a stop member engageable with a portion of a tool to be sharpened for holding it in position while being worked by said sharpening tool, a plate on said carriage movable relative thereto at substantially right angles to the direction in which said carriage moves relative to the axis of said tool shaft, said slide plate supporting said tool post in stationary relation to said carriage, and scale and pointer means on said carriage and said slide plate providing for a predetermined off-set relation of said tool post relative to said tool shaft and said carriage.

10. A base adapted to be secured on a drill press, an aligning means on said base, a tool shaft having second means cooperable with said aligning means for initially locating said base with respect to the axis of a drill press, tool chuck in which said tool shaft may be carried, third means for fixing said base on a drill press, a carriage on said base and movable laterally with respect to the axis of said tool shaft, a tool post supported by said carriage and movable thereby with respect to said tool shaft, a sharpening tool on said tool shaft, said tool post disposed to support a tool to be sharpened by said sharpening tool, said second means disengaged from said aligning means when said sharpening tool engages said tool to be sharpened, said third means having an extension adapted to extend through a drill press table and fix said base thereto.

11. A base adapted to be secured on a machine tool, an aligning means on said base, a tool shaft having second means cooperable with said aligning means for initially locating said base with respect to the axis of a tool chuck in which said tool shaft may be carried, third means for fixing said base on a machine tool employing said chuck, a carriage on said base and movable laterally with respect to the axis of said tool shaft, a tool post supported by said carriage and movable thereby with respect to said tool shaft, a sharpening tool on said tool shaft, said tool post disposed to support a tool to be sharpened by said sharpening tool, said second means disengaged from said aligning means when said sharpening tool engages said tool to be sharpened, a stop member engageable with a portion of a tool to be sharpened for holding it in position while being worked by said sharpening tool, and a fixture having bearing means engageable with said tool post and adapted to be supported thereon, said fixture and a tool to be sharpened being engageable with said stop member for holding the tool to be sharpened in certain position relative to said sharpening tool.

12. A base adapted to be secured on a machine tool, an aligning means on said base, a tool shaft having second means cooperable with said aligning means for initially locating said base with respect to the axis of a tool chuck in which said tool shaft may be carried, third means for fixing said base on a machine tool employing said chuck, a carriage on said base and movable laterally with respect to the axis of said tool shaft, a tool post supported by said carriage and movable thereby with respect to said tool shaft, a sharpening tool on said tool shaft, said tool post disposed to support a tool be be sharpened by said sharpening tool, said second means disengaged from said aligning means when said sharpening tool engages said tool to be sharpened, and lead screw means interengaging said base and said carriage for adjustably moving said carriage relative to said base.

References Cited in the file of this patent

UNITED STATES PATENTS

| | | |
|---|---|---|
| 727,981 | Lomasney | May 12, 1903 |
| 1,352,703 | Tulek | Sept. 14, 1920 |
| 1,596,727 | Goldberg | Aug. 17, 1926 |
| 2,082,310 | Turnepseed | June 1, 1937 |